April 21, 1959  P. SCHLUMBOHM  2,883,082
VACUUM FLASK COMBINATION
Filed June 12, 1957  2 Sheets-Sheet 1

INVENTOR.

April 21, 1959   P. SCHLUMBOHM   2,883,082
VACUUM FLASK COMBINATION
Filed June 12, 1957   2 Sheets-Sheet 2

INVENTOR.

United States Patent Office 2,883,082
Patented Apr. 21, 1959

2,883,082

VACUUM FLASK COMBINATION

Peter Schlumbohm, New York, N.Y.

Application June 12, 1957, Serial No. 669,395

4 Claims. (Cl. 215—6)

The present invention refers to a combination of a vacuum flask with an accessory. Vacuum flasks are built from tubular elements to resist the atmospheric pressure in the best manner and, the cylindrical vacuum flask is protected by an outer cylindrical casing. It is difficult to attach an accessory to such a cylindrical product.

One desirable accessory would be an immersion heater which necessarily has also elongated overall dimensions. Another desirable accessory would be a second vacuum bottle connected to a first vacuum bottle. In such cases it is, moreover, desirable to obtain something more than just a combination of two elements, as otherwise people would be pricewise better off to buy the two separate elements.

I have arrived at a solution which is illustrated by two examples in Fig. 1 to Fig. 5 of the accompanying drawings.

Figure 1:
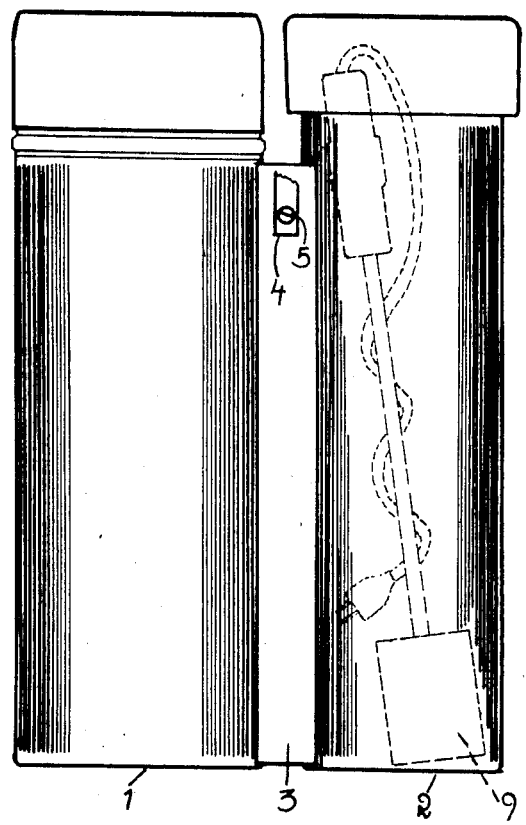
Fig. 1 shows, in a side view, the combination of a vacuum flask with an immersion heater which is held in a storage container.
Figure 2:
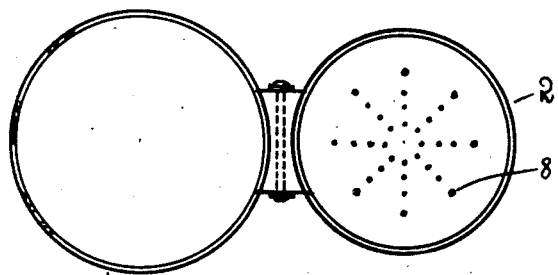
Fig. 2 is a bottom view of Fig. 1.

Fig. 1 shows a vacuum flask 1 forming a structural unit with a cylindrical container 2 which is the storage container for an immersion heater 9. It would be very impractical to store the immersion heater within the vacuum flask itself. Not only would there be the danger of mechanically hitting and breaking the glass walls of the inner shell of the vacuum flask during transportation, but it would also be objectionable to have the heater constantly within the food.

Thus I found that a practical solution would be to carry the immersion heater separately in an elongated cylindrical container, the height of which corresponds practically to the height of the vacuum flask, and the diameter of which is smaller than the diameter of the vacuum flask, to accommodate the structure of the immersion heater.

The difficult job of uniting these two cylindrical containers 1 and 2 was solved by providing spacing- and aligning-means 3. These are shown in detail in Fig. 3 in a top view. I use a bar from wood, cork or other material, the length of which extends over the greater part of the length of the vacuum flask 1 and container 2, as shown in Fig. 1. The bar has two beveled opposite walls, one bevel 6 which corresponds to the radius of the vacuum bottle 1 and one bevel 7 which corresponds to the radius of the container 2. These beveled surfaces offer a perfect bonding surface for applying cement. After a curing time of a few hours, the vacuum bottle 1 is bonded to the beveled surface 6 and the cylinder 2 is bonded safely to the beveled surface 7.

As I explained, this bar 3 serves the double purpose of being spacing- and aligning-means. Spacing means are required to allow unimpeded operation of the cover of the vacuum flask and the cover of the storage container. The aligning means are required to arrange these two elongated cylindrical elements in a parallel position to each other. This parallel position has the following advantages:

A. By providing for the storage container 2 a cylinder of smaller diameter than the diameter of the vacuum flask, the container 2, can serve as a handle when tilting the vacuum flask 1 for pouring.

B. By arranging the two cylinders in this position on the same bottom level, the resting base of the vacuum flask 1 is increased in a statically favorable manner.

C. Whereas a vacuum bottle by itself is difficult to place in a car because it rolls over, this new unit will not roll over.

D. By providing a strap 4 on a bolt 5, arranged in the upper section of the unit, it is possible to hang or carry the unit conveniently.

The device as shown in Fig. 1 would be operated as follows:

A traveler, before leaving his motel in the morning, would fill the vacuum flask with water and would insert the immersion heater 9 into the water. A 1000 watt unit will boil a quart in approximately 5–6 minutes, depending on the starting temperature. After the water has come to a boil, the immersion heater 9 is removed and placed back into the storage container 2. The boiling water in the vacuum flask 1 now can be used to prepare coffee or tea, by pouring the hot water on the coffee in a drip-type coffeemaker. In this case, after the completion of the dripping process, the coffee would be poured into the vacuum flask to be carried for the trip. Or, the boiling water may be kept in the vacuum bottle 1 and powdered coffee preparation may be added to it.

I believe that this unit, as shown in Fig. 1, represents a very practical and new equipment for the traveling motorist. Of course it also has its great merit in bachelor apartments where there is no stove and a scarcity of space. When testing this new unit among my own manufacturing staff, I found to my surprise, that, in spite of the simplicity of the apparatus, teaching is required for its usage and a measure has to be taken to make it fool proof. I found that the first reaction in several cases was "How do you get the boiling water out of the aluminum cylinder into the vacuum flask?" In other words, the assumption was that the cylinder 2 was the boiling vessel. To make the device in this respect fool proof, I have perforated the bottom with holes 8.

Figure 3:
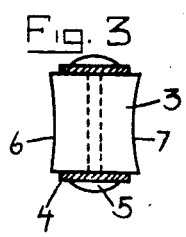
Fig. 3 shows a spacing- and aligning-means.
Figure 4:
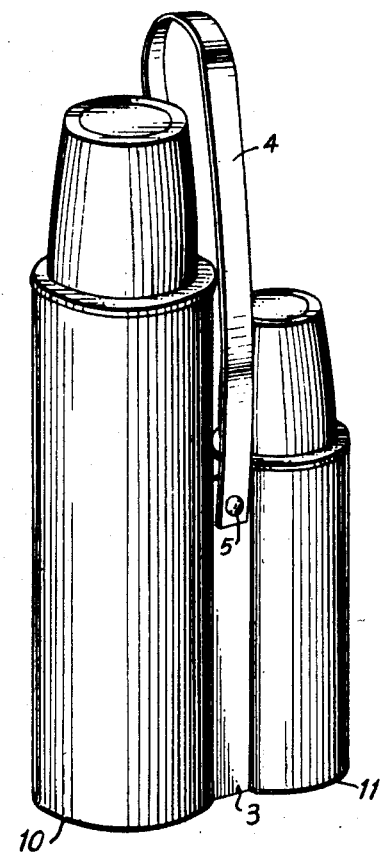
Fig. 4 shows a combination of two vacuum bottles.
Figure 5:
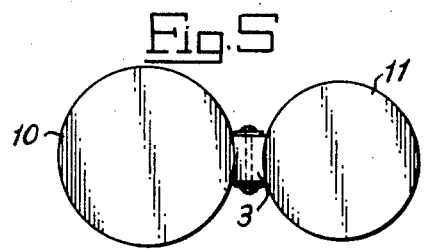
Fig. 5 is a bottom view of Fig. 4.

The arrangement of two vacuum bottles to form one unit, as shown in Fig. 4 in a perspective view, and in Fig. 5 as a bottom view of Fig. 4, utilizes the same bar 3 as shown in Fig. 3 to provide the spacing- and aligning-means. Again this combination as shown in Fig. 4 has a deeper meaning than just an aggregation of two vacuum flasks. Being the manufacturer of a widely known filter drip coffeemaker, Chemex, I have tried to teach people how to procure a coffee which will stay good in a vacuum flask. This is done by fractional extraction and perfect filtration.

The equipment shown in Fig. 4 contains a further teaching, which is to carry the hot black coffee in one vacuum flask by itself and to carry cold heavy cream separately in a second vacuum flask. This explains the different sizes of the two vacuum flasks in the unit, the left one 10 being for the black coffee and the smaller right one 11 for the cream. With such an equipment taken along on a trip, a cup of coffee with cream can be produced in perfect condition, even after two days from the date of filling in. If coffee and cream are mixed from the very beginning and then carried in a vacuum flask, far inferior results are obtained.

Having now described the nature of my invention and given examples of the manner in which it may be performed, I claim as my invention:

1. Vacuum flask combination comprising a cylindrical vacuum flask as one element, a cylindrical container having a bottom wall, side walls and an open top as second element, said two elements being arranged parallel to each other on the same base level, and a beveled, non-heat-conducting bar as third element, said bar being beveled on one side corresponding to the radius of the first element and being beveled on its opposite side corresponding to the radius of the second element and being vertically arranged between element one and element two and parallel to the axis of the two elements and extending substantially throughout the length of at least one of the first two elements, said third element serving as spacing-, aligning- and bonding-means between the first and second element, all three elements being bonded into one structural entity by cementing the beveled surfaces of the third element to the contacted surfaces of the other two elements.

2. Vacuum flask combination comprising a cylindrical vacuum flask as one element, a cylindrical container having a bottom wall, side walls and an open top as second element, said two elements being arranged parallel to each other on the same base level, and a beveled, non-heat-conducting bar as third element, said bar being beveled on one side corresponding to the radius of the first element and being beveled on its opposite side corresponding to the radius of the second element and being vertically arranged between element one and element two and parallel to the axis of the two elements, and extending substantially throughout the length of at least one of the first two elements, said third element serving as spacing-, aligning- and bonding means between the first and the second element, all three elements being bonded into one structural entity by cementing the beveled surfaces of the third element to the contacted surfaces of the other two elements; said bottom wall of the second element being perforated.

3. Vacuum flask combination comprising a cylindrical vacuum flask as one element, a cylindrical container having a bottom wall, side walls and an open top as second element, said two elements being arranged parallel to each other on the same base level, and a beveled, non-heat-conducting bar as third element, said bar being beveled on one side corresponding to the radius of the first element and being beveled on its opposite side corresponding to the radius of the second element and being vertically arranged between element one and element two and parallel to the axis of the two elements, and extending substantially throughout the length of at least one of the first two elements, said third element serving as spacing-, aligning- and bonding means between the first and the second element, all three elements being bonded into one structural entity by cementing the beveled surfaces of the third element to the contacted surfaces of the other two elements; a carrying strap being anchored in the upper section of the vertically arranged bar.

4. Coffee-carrying picnic kit comprising a cylindrical vacuum flask as one element, a second cylindrical vacuum flask as second element, said two elements being arranged parallel to each other on the same base level, and a beveled, non-heat-conducting bar as third element, said bar being beveled on one side corresponding to the radius of the first element and being beveled on its opposite side corresponding to the radius of the second element and being vertically arranged between element one and element two and parallel to the axis of the first two elements, and extending substantially throughout the length of at least one of the first two elements, said third element serving as spacing-, aligning- and bonding means between the first and the second element, all three elements being bonded into one structural entity by cementing the beveled surfaces of the third element to the contacted surfaces of the other two elements; whereby hot black coffee can be carried in one vacuum flask and cold cream can be carried in the second vacuum flask.

References Cited in the file of this patent

UNITED STATES PATENTS

| | | |
|---|---|---|
| 1,568,160 | Hibbert | Jan. 5, 1926 |
| 1,583,920 | Freeland | May 11, 1926 |
| 2,314,942 | Hinchcliff | Mar. 30, 1943 |
| 2,567,487 | Kelly | Sept. 11, 1951 |
| 2,645,392 | Gottsegen | July 14, 1953 |